United States Patent
Lee

(10) Patent No.: US 8,405,363 B2
(45) Date of Patent: Mar. 26, 2013

(54) CONTACT MODULE FOR RECHARGEABLE BATTERY, MOBILE ELECTRONIC DEVICE HAVING THE SAME CONTACT MODULE AND METHOD OF PREVENTING RECHARGEABLE BATTERY FROM EXPLODING USING THE SAME CONTACT MODULE

(75) Inventor: Se-Yeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1024 days.

(21) Appl. No.: 12/284,821

(22) Filed: Sep. 25, 2008

(65) Prior Publication Data
US 2009/0108812 A1 Apr. 30, 2009

(30) Foreign Application Priority Data
Oct. 30, 2007 (KR) ........................ 10-2007-0109417

(51) Int. Cl.
*H02J 7/00* (2006.01)
(52) U.S. Cl. ........................................ 320/150; 320/154
(58) Field of Classification Search .................. 320/150, 320/154
See application file for complete search history.

(56) References Cited

U.S. PATENT DOCUMENTS

| | | | | |
|---|---|---|---|---|
| 6,326,766 | B1 * | 12/2001 | Small | 320/112 |
| 2006/0043928 | A1 * | 3/2006 | Nakasho et al. | 320/112 |
| 2006/0273760 | A1 * | 12/2006 | Yang | 320/112 |
| 2007/0139004 | A1 * | 6/2007 | Satsuma | 320/114 |
| 2008/0042623 | A1 * | 2/2008 | Leung | 320/165 |
| 2008/0094028 | A1 * | 4/2008 | Yang | 320/114 |

OTHER PUBLICATIONS

"Certification Requirements for Battery System Compliance to IEEE 1725", CTIA Certification, Apr. 2007, Revision 1.2, 70 pages.
"Livium 1725, IEEE Standard for Rechargeable Batteries for Cellular Telephones", IEEE Power Engineering Society, Apr. 18, 2006, 80 pages.

* cited by examiner

*Primary Examiner* — Bot Ledynh

(57) ABSTRACT

A mobile electronic device having a contact module and a method of preventing a rechargeable battery from exploding using a contact module. The contact module includes a contact module body disposed inside a mobile electronic device; a plurality of contact terminals elastically fitted to the contact module body to be electrically connected to contact terminals of the rechargeable battery; and a temperature sensor module disposed on one side of the contact module to detect a temperature of the rechargeable battery. The contact module is embodied by setting contact terminals and a temperature sensor module into one unitary module, and can correctly measure the temperature of the rechargeable battery to effectively prevent the rechargeable battery from exploding when the battery is being charged.

20 Claims, 9 Drawing Sheets ium cell is apt to explode or cause fire when it is exposed to heat. To prevent this, safety regulations require that the charging of the rechargeable battery be interrupted when the rechargeable battery is heated to a predetermined temperature or higher.

CONTACT MODULE FOR RECHARGEABLE BATTERY, MOBILE ELECTRONIC DEVICE HAVING THE SAME CONTACT MODULE AND METHOD OF PREVENTING RECHARGEABLE BATTERY FROM EXPLODING USING THE SAME CONTACT MODULE

CROSS-REFERENCE TO RELATED APPLICATION(S) AND CLAIM OF PRIORITY

The present application makes reference to, incorporates the same herein, and claims all benefits accruing under 35 U.S.C. from an application for "CONTACT MODULE FOR RECHARGEABLE BATTERY, MOBILE ELECTRONIC DEVICE HAVING THE SAME CONTACT MODULE AND METHOD OF PREVENTING RECHARGEABLE BATTERY FROM EXPLODING USING THE SAME CONTACT MODULE" filed in the Korean Intellectual Property Office on Oct. 30, 2007, and there duly assigned Serial No. 2007-0109417.

TECHNICAL FIELD OF THE INVENTION

The present invention relates to a contact module for a rechargeable battery, a mobile electronic device having the contact module and a method of preventing a rechargeable battery from exploding using the contact module. More particularly, the contact module of the present invention is embodied by setting contact terminals and a temperature sensor module into one unitary module in order to effectively prevent the rechargeable battery from exploding when the battery is being charged.

BACKGROUND OF THE INVENTION

In general, a mobile electronic device is powered from a rechargeable battery to improve the portability thereof. Examples of the mobile electronic device may include various types of acoustic, image and information devices, such as a mobile communication device (a so-called mobile phone), a digital camera, a digital multimedia player (DMP), a portable multimedia player (PMP), an MP3 player (MP3P) and a personal digital assistant (PDA). In addition, the demands of users are also significantly increasing.

A mobile communication device, presented as an example of the mobile electronic device, uses an external rechargeable battery and an internal rechargeable battery. The external rechargeable battery is detachably mounted to the backside of a mobile communication device body so as to be seen from outside, whereas the internal rechargeable battery received in the backside of the mobile communication device body is enclosed from outside by a cover.

Recently, in mobile communication devices, accidents caused by the explosion of rechargeable batteries are frequently occurring. An accident involving a rechargeable battery is more dangerous than other accidents since it can directly lead to explosion or fire. Thus, safety regulations related to rechargeable batteries are being further intensified in many countries.

A rechargeable battery such as a lithium (Li) ion rechargeable cell is apt to explode or cause fire when it is exposed to heat. To prevent this, safety regulations require that the charging of the rechargeable battery be interrupted when the rechargeable battery is heated to a predetermined temperature or higher.

Conventionally, a temperature measuring device called a thermistor is generally used to control the operation of a mobile communication device by detecting the temperature thereof. The thermistor is a device whose resistance varies as a function of temperature. The resistance varying with temperature causes a voltage variation, which a processor can detect to recognize a temperature change.

While the temperature of the rechargeable battery can be correctly measured using the thermistor mounted inside the battery, contact terminals for transmitting signals to the processor are additionally provided in the rechargeable battery, thereby increasing manufacturing costs.

Furthermore, while the thermistor can be fitted in a circuit board through a simple process, heat from the circuit board makes it difficult to correctly measure the temperature of the thermistor.

SUMMARY OF THE INVENTION

To address the above-discussed deficiencies of the prior art, it is a primary object to provide a contact module for a rechargeable battery, a mobile electronic device having the contact module and a method of preventing a rechargeable battery from exploding using the contact module, in which the contact module is embodied by setting contact terminals and a temperature sensor module into one unitary module, and can correctly measure the temperature of the rechargeable battery to effectively prevent the rechargeable battery from exploding when the battery is being charged.

According to an aspect of the present invention, there is provided a contact module for a rechargeable battery. The contact module includes a contact module body disposed inside a mobile electronic device; a plurality of contact terminals elastically fitted to the contact module body to be electrically connected to contact terminals of the rechargeable battery; and a temperature sensor module disposed on one side of the contact module to detect a temperature of the rechargeable battery.

The contact terminals and the temperature sensor module of the contact module are electrically connected to a circuit module on a circuit board inside the mobile electronic device.

The temperature sensor module may include a sensor disposed adjacent to the rechargeable battery to measure a temperature of the rechargeable battery; a first line, which electrically connects the sensor to a ground terminal of the contact terminals of the contact module; and a second line, which electrically connects the sensor to a circuit module on a circuit board.

The sensor module may be one selected from the group consisting of a thermistor, a platinum resistance temperature sensor, a thermocouple, a radiation thermometer and an integrated circuit (IC) temperature sensor.

According to another aspect of the present invention, there is provided a contact module for a rechargeable battery. The contact module includes a contact module body disposed inside a mobile electronic device, and having a mounting-hole in one side thereof; a plurality of contact terminals elastically disposed in the contact module body to be electrically connected to contact terminals of the rechargeable battery; and a temperature sensor module fitted into the mounting-hole of the contact module to detect a temperature of the rechargeable battery.

The contact terminals and the temperature sensor modules of the contact module are electrically connected to a circuit module on a circuit board inside the mobile electronic device.

The sensor may have hooks on different portions of one side thereof, the hooks fitting into the mounting-hole.

According to a further aspect of the present invention, there is provided a mobile electronic device, which includes a mobile electronic device body; a rechargeable battery detachably fitted to the mobile electronic device body, and having a plurality of contact terminals on one side thereof; and a contact module disposed inside the mobile electronic device body, the contact module comprising a plurality of contact terminals contacting the contact terminals of the rechargeable battery and a temperature sensor module detecting a temperature of the rechargeable battery.

The contact terminals and the temperature sensor modules of the contact module are electrically connected to a circuit module on a circuit board inside the mobile electronic device.

The temperature sensor module may include a sensor disposed adjacent to the rechargeable battery to measure a temperature of the rechargeable battery; a first line, which electrically connects the sensor to a ground terminal of the contact terminals of the contact module; and a second line, which electrically connects the sensor to a circuit module on a circuit board.

According to yet another aspect of the present invention, there is provided a method of preventing a rechargeable battery from exploding, in which a temperature sensor module of a contact module, adjacent to contact terminals of the contact module, detects a temperature of the rechargeable battery when the battery is being charged, and sends the detected temperature of the rechargeable battery to a circuit module on a circuit board inside a mobile electronic device, and the circuit module compares at the temperature of the rechargeable battery with a predetermined temperature, continues to charge the rechargeable battery and repeats the detecting of a temperature of the rechargeable battery when the temperature of the rechargeable battery is lower than the predetermined temperature, and cuts off a charging line to interrupt charging the rechargeable battery in order to prevent the rechargeable battery from exploding when the temperature of the rechargeable battery is equal to or higher than the predetermined temperature.

According to the present invention as set forth above, the contact module is embodied by setting the contact terminals and the temperature sensor module into one unitary module, and can correctly measure the temperature of the rechargeable battery to effectively prevent the rechargeable battery from exploding when the battery is being charged.

Furthermore, the structure with the temperature sensor module combined into the contact module can simplify the overall construction, thereby greatly reducing manufacturing costs, while effectively preventing the rechargeable battery from exploding.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile electronic device.

Figure 1:
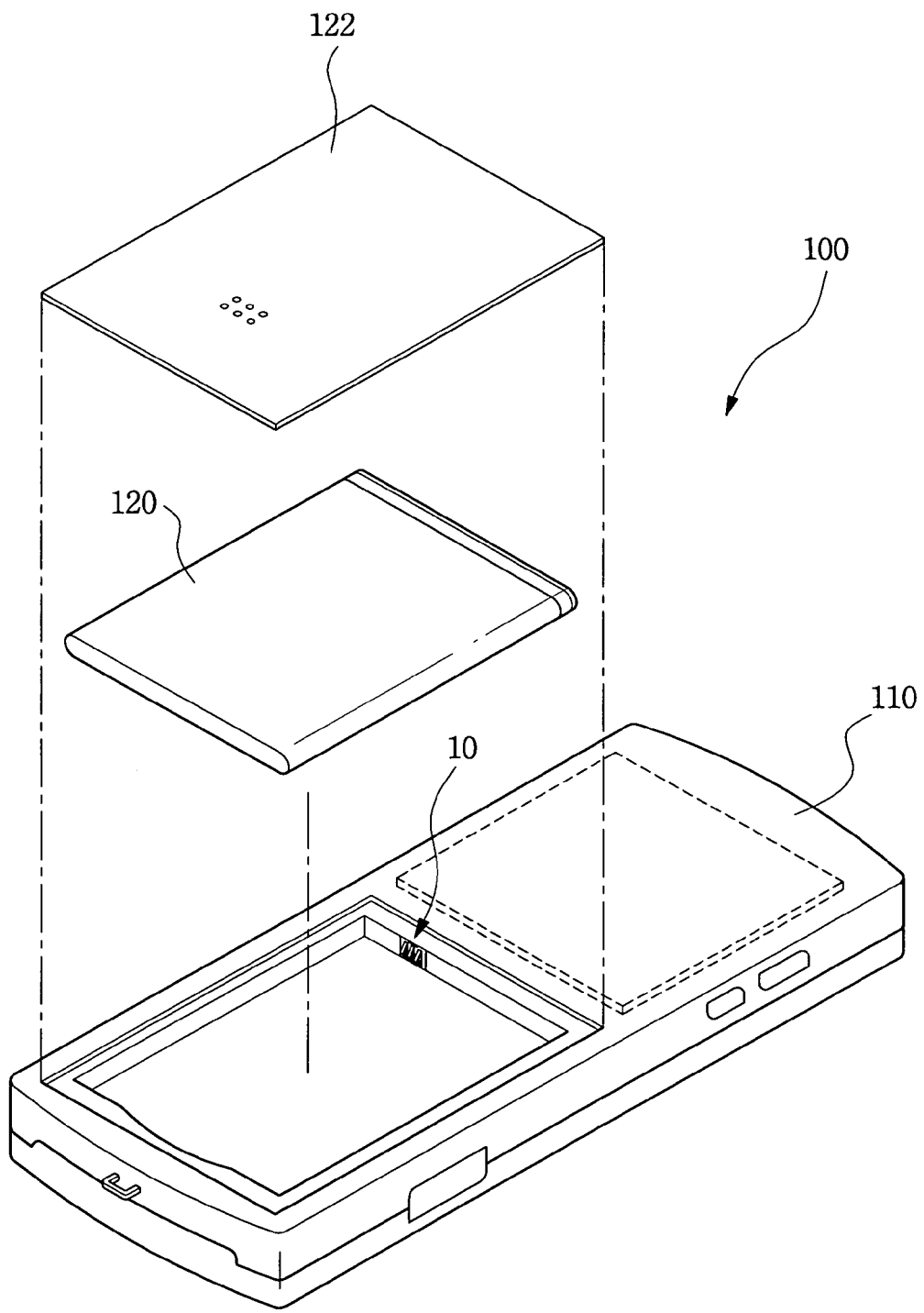
FIG. 1 is an exploded perspective view of a mobile electronic device according to an embodiment of the present invention.
Figure 2:
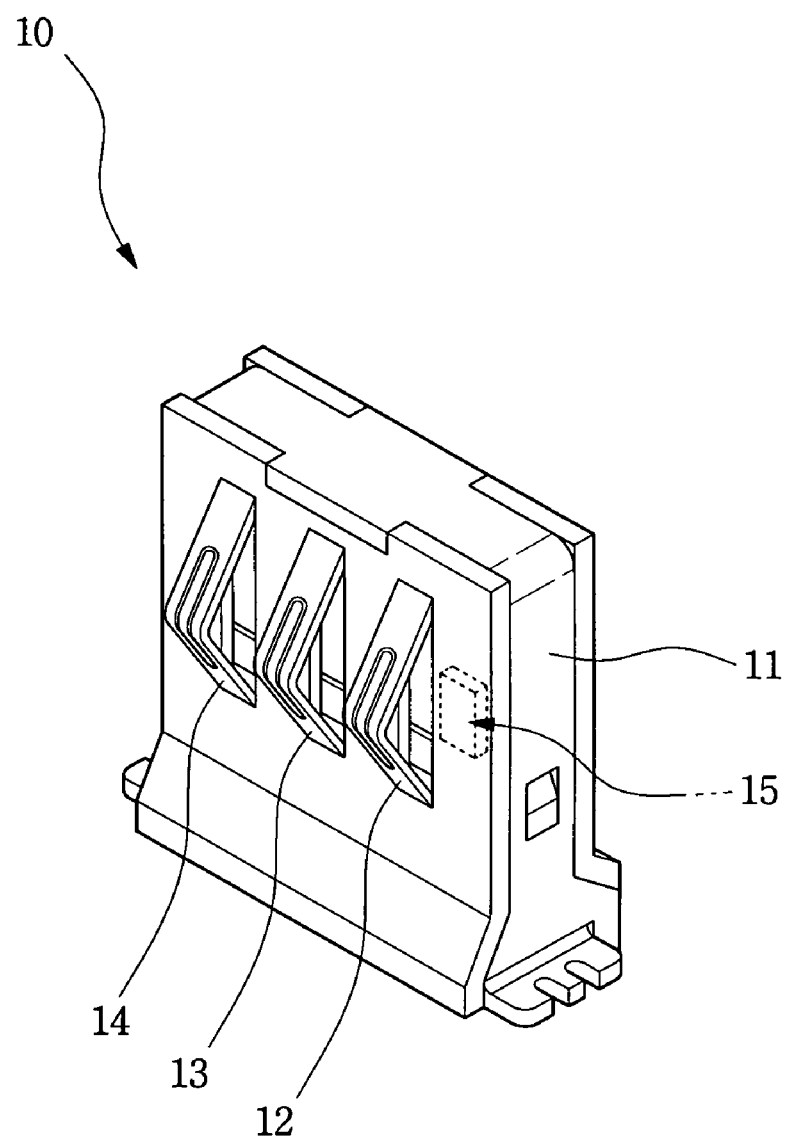
FIG. 2 is a perspective view of a contact module for a rechargeable battery according to an embodiment of the present invention.
Figure 3:
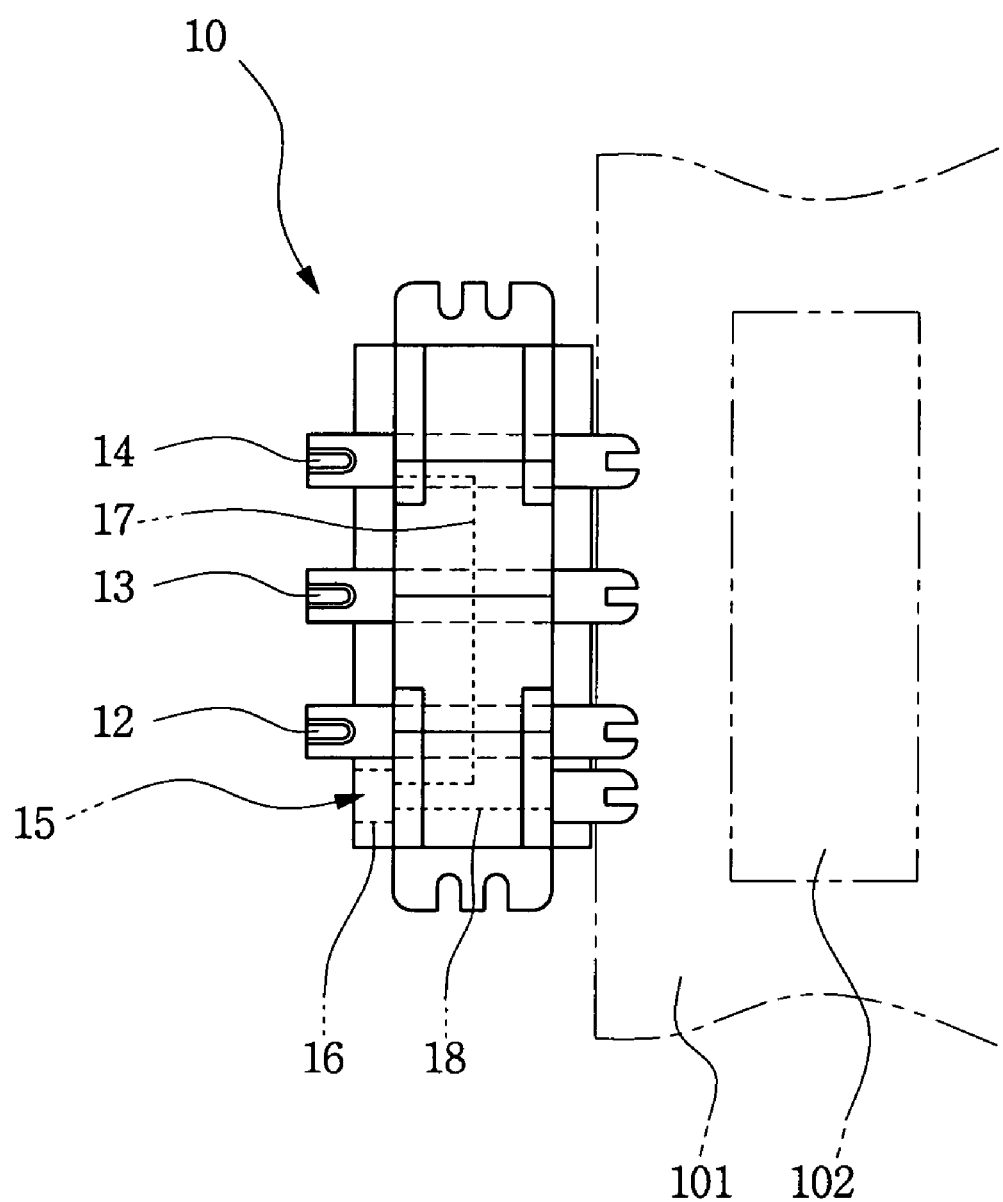
FIG. 3 is a plan view of the contact module of FIG. 2.
Figure 4:
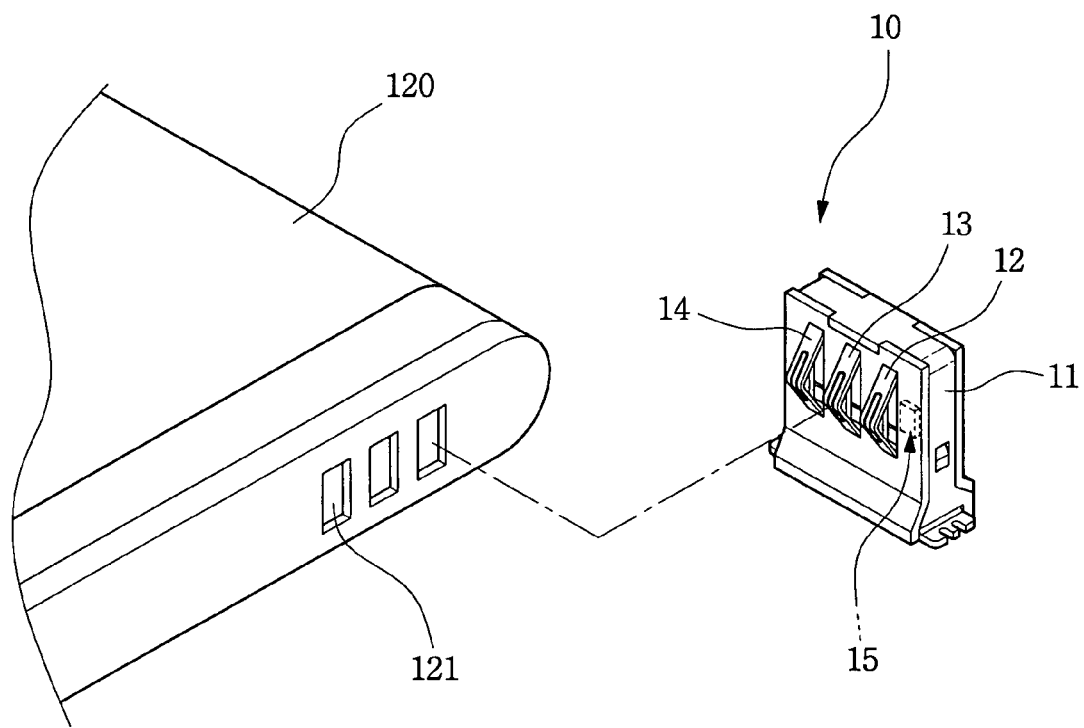
FIG. 4 is a perspective view explaining electric connection between the contact terminals of the contact module of FIG. 2 and contact terminals of the rechargeable battery.

FIG. 1 is an exploded perspective view of a mobile electronic device according to an embodiment of the present invention, FIG. 2 is a perspective view of a contact module for a rechargeable battery according to an embodiment of the present invention, FIG. 3 is a plan view of the contact module of FIG. 2, and FIG. 4 is a perspective view explaining electric connection between the contact terminals of the contact module of FIG. 2 and contact terminals of the rechargeable battery.

In the description of the present invention, the mobile electronic device will be illustrated by way of example as being a mobile communication device (a so-called mobile phone).

As shown in FIG. 1, a mobile electronic device 100 of the present invention includes a mobile electronic device body 110 and a rechargeable battery 120, which is detachably fitted to the body 110 to charge or power the body 110. The rechargeable battery 120 has a plurality of contact terminals 121 at one side thereof. A rechargeable battery cover 122 can be fitted to the body 110 to cover the rechargeable battery 120 from outside.

A contact module for a rechargeable battery (hereinafter, referred to as a "contact module"), designated with the reference number 10, is provided in the mobile electronic body 110. The contact module 10 contacts the rechargeable battery 120, which serves to power the mobile electronic device body 110.

Now, the contact module 10 of this embodiment will be described in more detail with reference to FIGS. 2 to 4.

The contact module 10 of this embodiment includes a contact module body 11, which is disposed inside the mobile electronic device body 110 in order to charge the rechargeable battery 120.

The contact module body 11 has a plurality of elastic contact terminals 12, 13 and 14, which are provided to contact the contact terminals 121 of the rechargeable battery 120.

The contact terminals 12 to 14 of the contact module body 11 are configured to be elastically pressed down by their own elasticity, so that the contact terminals 12 to 14 of the contact module 10 and the contact terminals 121 of the rechargeable battery 120 will not come loose when they contact each other.

A temperature sensor module 15 is provided in the contact module body 11 to detect the temperature of the rechargeable battery 120 when the battery 120 is being recharged.

The contact terminals 12 to 14 of the contact module body 11 are electrically connected to a circuit module 102 on a circuit board 101, which is disposed inside the mobile electronic device 100.

The temperature sensor module 15 includes a sensor 16, which is disposed adjacent to the rechargeable battery 120 to measure the temperature of the battery 120, a first line 17, which electrically connects the sensor 16 to the ground terminal 14 of the contact terminals 12 to 14, and a second line 18, which electrically connects the sensor 16 and the circuit module 102 on the circuit board 101.

The second line 18 of the temperature sensor module 15 is electrically connected to the circuit module 102 on the circuit board 101, and the first line 17 of the temperature sensor module 15 is electrically connected to the ground terminal 14 of the contact terminals 12 to 14 of the contact module 10.

The sensor 16 can be implemented with any one of a thermistor, a platinum resistance temperature sensor, a thermocouple, a radiation thermometer and an integrated circuit (IC) temperature sensor.

Figure 5:
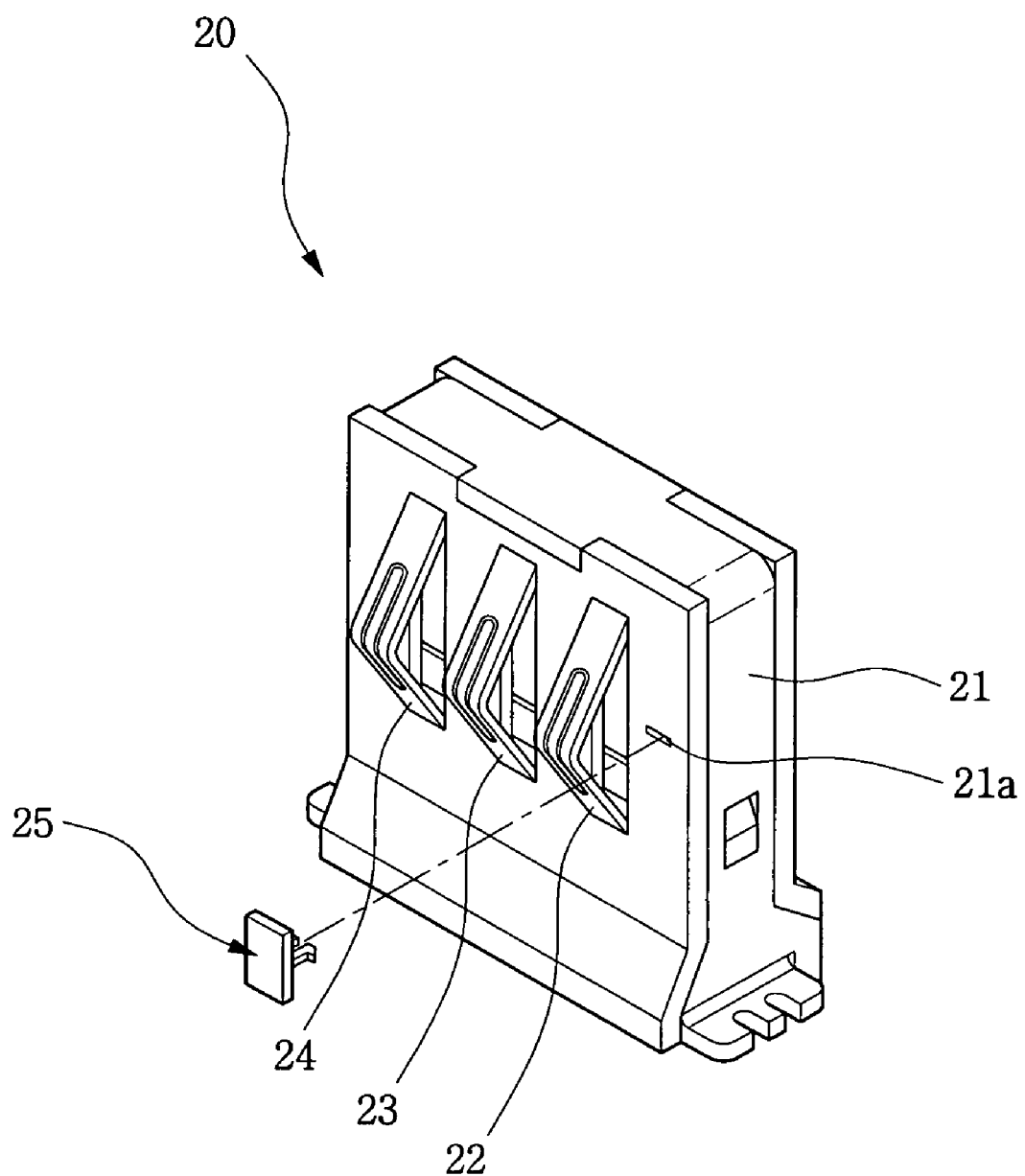
FIG. 5 is a perspective view of a contact module for a rechargeable battery according to another embodiment of the present invention.
Figure 6:
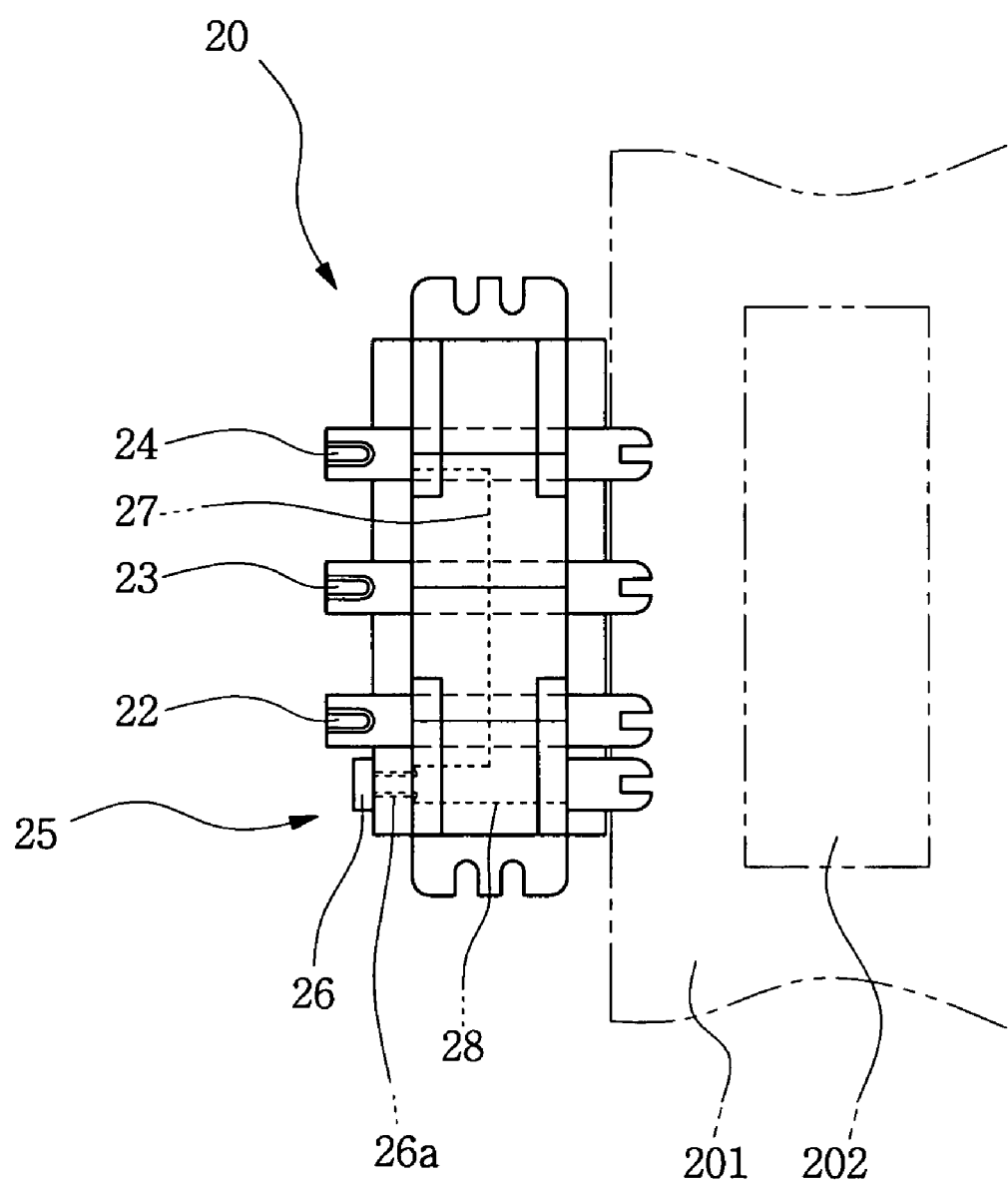
FIG. 6 is a plan view of the contact module of FIG. 5.
Figure 7:
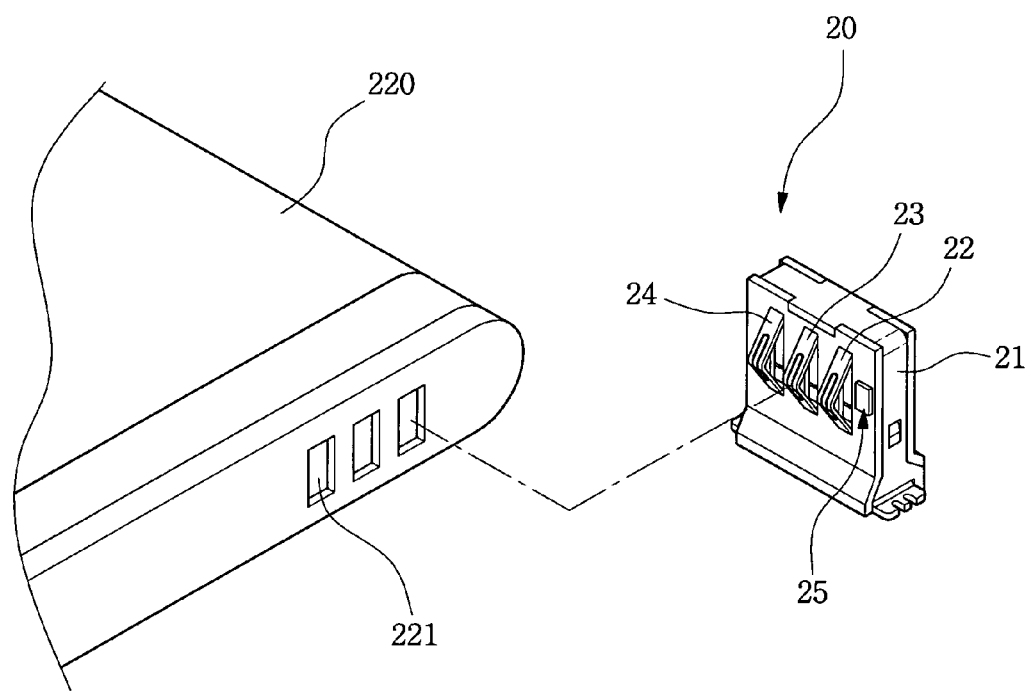
FIG. 7 is a perspective view explaining electric connection between the contact terminals of the contact module of FIG. 5 and contact terminals of the rechargeable battery.
Figure 8:
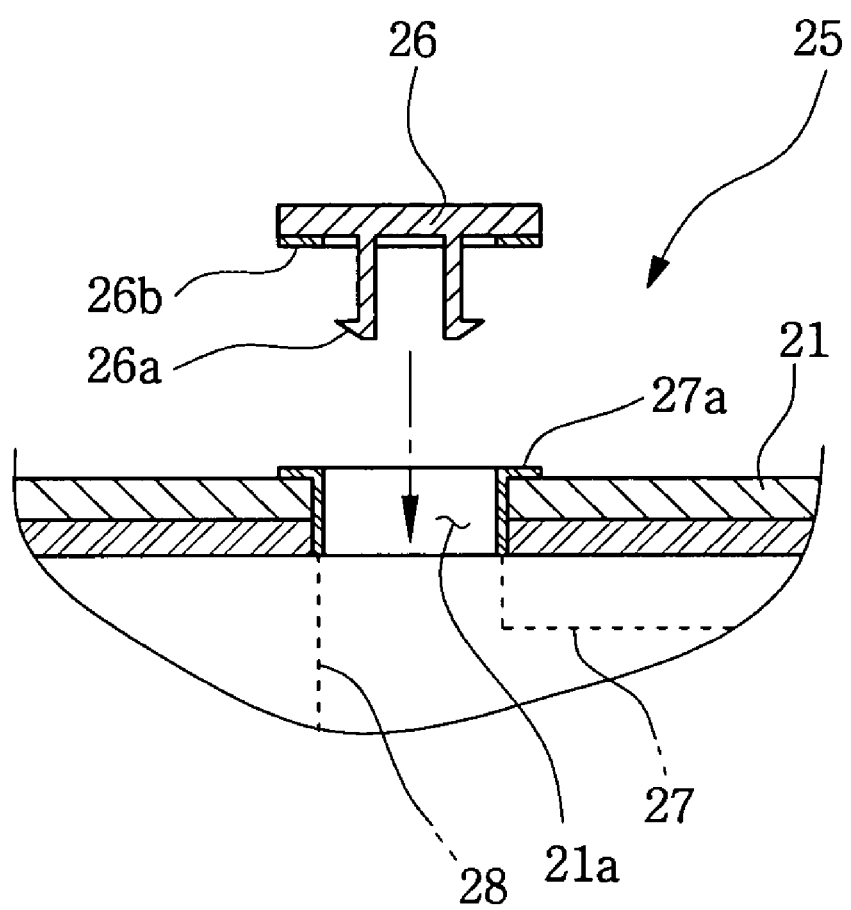
FIG. 8 is a vertical cross-sectional view explaining a process of fitting the sensor module of FIG. 5 into a mounting-hole.

In the meantime, FIG. 5 is a perspective view of a contact module for a rechargeable battery according to another embodiment of the present invention, FIG. 6 is a plan view of the contact module of FIG. 5, FIG. 7 is a perspective view explaining electric connection between the contact terminals of the contact module of FIG. 5 and contact terminals of the rechargeable battery, and FIG. 8 is a vertical cross-sectional view explaining a process of fitting the sensor module of FIG. 5 into a mounting-hole.

Referring to the above-mentioned drawings, a contact module 20 of this embodiment is fitted in a mobile electronic device (not shown) in order to charge or supply a rechargeable battery 220, and has a contact module body 21 having a mounting-hole 21a in one side thereof.

The rechargeable battery 220 has a plurality of contact terminals 221, and the contact module body 21 has a plurality of elastic contact terminals 22, 23 and 24, which are provided to contact the contact terminals 221 of the rechargeable battery 220. The contact terminals 22 to 24 of the contact module body 21 are configured to be elastically pressed down, so that the contact terminals 22 to 24 of the contact module 20 and the contact terminals 221 of the rechargeable battery 220 will not come loose when they contact each other.

The contact terminals 22 to 24 of the contact module body 21 are electrically connected to a circuit module 202 on a circuit board 201, which is disposed inside the mobile electronic device.

A temperature sensor module 25 is fitted in the mounting-hole 21a of the contact module body 21 in order to detect the temperature of the rechargeable battery 220.

The temperature sensor module 25 includes a sensor 26, which is disposed adjacent to the rechargeable battery 220 to measure the temperature of the battery 220, a first line 27, which electrically connects the sensor 26 to the ground terminal 24 of the contact terminals 22 to 24, and a second line 28, which electrically connects the sensor 26 and the circuit module 202 on the circuit board 201.

The sensor 26 has a pair of hooks 26a protruding from one side thereof. The hooks 26a are configured to be elastically fitted into or extracted from the mounting-hole 21a, thereby facilitating to replace a broken sensor 26 with a new one.

A connecting piece 26b is provided on one side of the sensor 26 and a connecting piece 27a is provided on the terminal end of the second line 28, so that the first and second lines 27 and 28 are electrically connected when the sensor 26 is fitted into the mounting-hole 21a.

Figure 9:
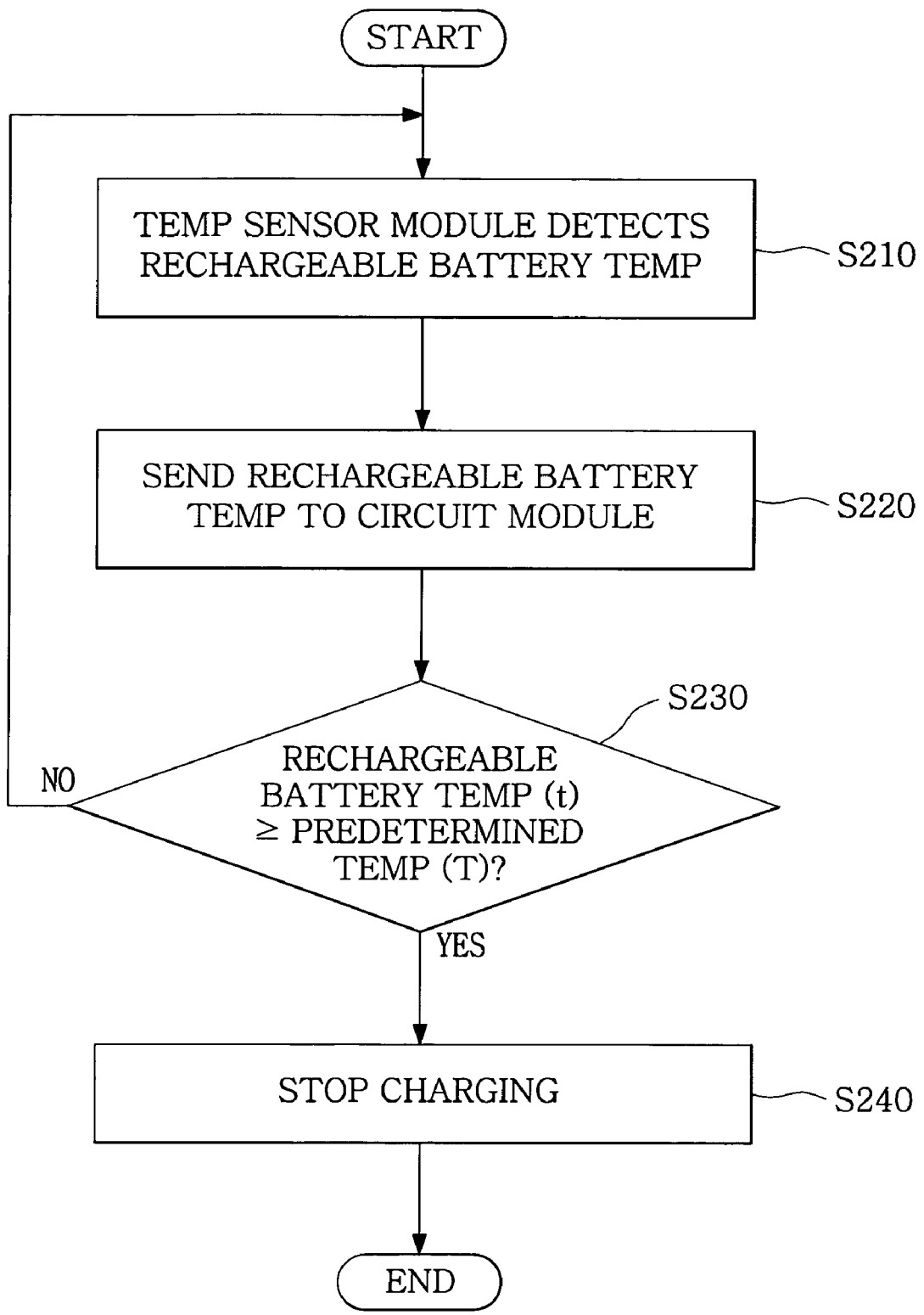
FIG. 9 is a flowchart of a process of preventing a rechargeable battery from exploding using the contact module of the present invention.

FIG. 9 is a flowchart of a process of preventing a rechargeable battery from exploding using the contact module of the present invention.

Referring to FIG. 9, the process of preventing a rechargeable battery from exploding using the contact module of the present invention is carried out by the following steps. In the step S210, the temperature sensor module, such as a thermistor, disposed adjacent to the contact terminals of the contact module, detects the temperature of the rechargeable battery, for example, when the rechargeable battery is being charged. In the second step S220, the temperature sensor module sends the detected temperature of the rechargeable battery to the circuit module on the circuit board in the mobile electronic device body. In the third step S230, the circuit module compares the temperature of the rechargeable battery with a preset temperature. In the third step S230, when the rechargeable battery is cooler than the predetermined temperature as the result of the comparison, the circuit module continues to charge the rechargeable battery while the sensor module detects the temperature of the rechargeable battery. On the other hand, when the rechargeable battery is not cooler than the predetermined temperature, the circuit module cuts off the charging line in order to prevent the rechargeable battery from exploding in step S240.

More particularly, in the step S210 of detecting the temperature of the rechargeable battery, the temperature sensor module is located adjacent to the contact terminals of the contact module in order to precisely detect the temperature of the rechargeable battery. As a result, the temperature sensor module is not affected by heat from the circuit board, and also can precisely measure the temperature of the rechargeable battery without using a flexible printed circuit board (FPCB).

In the step S220 of sending the temperature of the rechargeable battery, detected by the temperature sensor module, to the circuit module on the circuit board of the mobile electronic device, the temperature sensor module detects the temperature of the rechargeable battery when it is being charged, and sends the detected value to the circuit module, for example, various circuit elements mounted on the circuit board.

In the step S230 of comparing the temperature of the rechargeable battery with the predetermined temperature, the circuit module continues to charge the rechargeable battery when the rechargeable battery temperature t is lower than the predetermined temperature T. On the other hand, when the rechargeable battery temperature t is not lower than the predetermined temperature T, the circuit module cuts off the charging line to interrupt charging the rechargeable battery, thereby preventing the rechargeable battery from exploding. According to a series of the procedures as described above, the process of the present invention can effectively prevent the rechargeable battery from exploding, which would otherwise be caused by overheating when the battery is being charged.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A rechargeable battery contact module comprising:
a contact module body configured to be disposed inside a mobile electronic device;
a plurality of elastic contact terminals configured on the contact module body, the contact terminals configured to be electrically connected to contact terminals of the rechargeable battery; and
a temperature sensor module configured to be disposed on one side of the contact module, and to detect a temperature of the rechargeable battery, the temperature sensor module being movable from a mounted position on the contact module to an extracted position away from the contact module, the temperature sensor module comprising a temperature sensor configured to be electrically coupled to a circuit board of the mobile electronic device using two or more first connecting portions configured on the temperature sensor that make contact with two or more second connecting portions configured on the contact module body when the temperature sensor is in the mounted position.

2. The contact module according to claim 1, wherein the contact terminals and the temperature sensor module of the contact module are configured to be electrically connected to a circuit module on a circuit board inside the mobile electronic device.

3. The contact module according to claim 1, wherein the temperature sensor module further comprises a circuit line configured to couple the sensor to a circuit module on a circuit board inside the mobile electronic device.

4. The contact module according to claim 3, wherein the sensor comprises at least one of a thermistor, a platinum resistance temperature sensor, a thermocouple, a radiation thermometer, and an integrated circuit temperature sensor.

5. A rechargeable battery contact module comprising:
a contact module body configured to be disposed inside a mobile electronic device, the contact module including a mounting-hole in one side;
a plurality of elastic contact terminals configured on the contact module body, the contact terminals configured to be electrically connected to contact terminals of the rechargeable battery; and
a temperature sensor module configured to be removably fitted into the mounting-hole of the contact module to detect a temperature of the rechargeable battery, the temperature sensor module being movable from a mounted position on the contact module to an extracted position away from the contact module, the temperature sensor module comprising a temperature sensor configured to be electrically coupled to a circuit board of the mobile electronic device using the elastic contact terminals that make contact with two or more second connecting portions configured on the contact module body when the temperature sensor is in the mounted position.

6. The contact module according to claim 5, wherein the contact terminals and the temperature sensor module of the contact module are electrically connected to a circuit module on a circuit board inside the mobile electronic device.

7. The contact module according to claim 5, wherein the temperature sensor module comprises a circuit line configured to couple the sensor to a circuit module on a circuit board inside the mobile electronic device.

8. The contact module according to claim 7, wherein the sensor comprises at least one of a thermistor, a platinum resistance temperature sensor, a thermocouple, a radiation thermometer, and an integrated circuit temperature sensor.

9. The contact module according to claim 7, wherein the sensor includes hooks on different portions of one side of the sensor, the hooks configured to fit into the mounting-hole.

10. A mobile electronic device comprising:
a mobile electronic device body;
a contact module configured to be disposed inside the mobile electronic device body, the contact module comprising a plurality of contact terminals configured to couple a plurality of contact terminals of a rechargeable battery: and
a temperature sensor module configured to detect a temperature of the rechargeable battery, the temperature sensor module being movable from a mounted position on the contact module to an extracted position away from the contact module, the temperature sensor module comprising a temperature sensor configured to be electrically coupled to a circuit board of the mobile electronic device using the elastic contact terminals that make contact with two or more second connecting portions configured on the contact module body when the temperature sensor is in the mounted position.

11. The mobile electronic device according to claim 10, wherein the contact terminals and the temperature sensor module of the contact module are electrically connected to a circuit module on a circuit board inside the mobile electronic device.

12. The mobile electronic device according to claim 10, wherein the temperature sensor module comprises a circuit line configured to couple the sensor to a circuit module on a circuit board inside the mobile electronic device.

13. A method of preventing a rechargeable battery from exploding, the method comprising:
removably mounting a temperature sensor on a contact module configured to be disposed inside a mobile electronic device and to electrically couple the rechargeable battery to the mobile electronic device, the temperature sensor module comprising a temperature sensor configured to be electrically coupled to a circuit board of the mobile electronic device using two or more elastic contact terminals that make contact with two or more second connecting portions configured on the contact module body when the temperature sensor is in the mounted position;
detecting a temperature of the rechargeable battery at a temperature sensor module of a contact module adjacent to contact terminals of the contact module;
sending, at the temperature sensor module, the detected temperature of the rechargeable battery through a circuit line to a circuit module on a circuit board inside a mobile electronic device;
comparing, at the circuit module, the temperature of the rechargeable battery with a predetermined temperature; and
continuing to charge, at the circuit module, the rechargeable battery and repeating the detecting of a temperature of the rechargeable battery when the temperature of the rechargeable battery is lower than the predetermined temperature, and cutting off a charging line to interrupt charging the rechargeable battery in order to prevent the rechargeable battery from exploding when the temperature of the rechargeable battery is equal to or higher than the predetermined temperature.

14. A method of preventing a rechargeable battery from exploding, the method comprising:

removably mounting a temperature sensor on a contact module configured to be disposed inside a mobile electronic device and to electrically couple the rechargeable battery to the mobile electronic device, the temperature sensor module comprising a temperature sensor configured to be electrically coupled to a circuit board of the mobile electronic device using two or more elastic contact terminals that make contact with two or more second connecting portions configured on the contact module body when the temperature sensor is in the mounted position;

detecting a temperature of the rechargeable battery at a temperature sensor module of a contact module adjacent to contact terminals of the contact module; and sending, at the temperature sensor module, the detected temperature of the rechargeable battery through a second line to a circuit module on a circuit board inside a mobile electronic device.

15. The method according to claim 14, wherein the contact terminals and the temperature sensor module of the contact module are electrically connected to the circuit module on the circuit board inside the mobile electronic device.

16. The method according to claim 14, wherein the temperature sensor module comprises:

the first line, which electrically connects the sensor to a ground terminal of the contact terminals of the contact module; and the second line, which electrically connects the sensor to the circuit module on the circuit board inside the mobile electronic device.

17. The method according to claim 14, wherein the sensor comprises at least one of a thermistor, a platinum resistance temperature sensor, a thermocouple, a radiation thermometer, and an integrated circuit temperature sensor.

18. A method of preventing a rechargeable battery from exploding, the method comprising:

removably mounting a temperature sensor on a contact module configured to be disposed inside a mobile electronic device and to electrically couple the rechargeable battery to the mobile electronic device, the temperature sensor module comprising a temperature sensor configured to be electrically coupled to a circuit board of the mobile electronic device using two or more elastic contact terminals that make contact with two or more second connecting portions configured on the contact module body when the temperature sensor is in the mounted position;

comparing, at a circuit module on a circuit board inside a mobile electronic device, a detected temperature of the rechargeable battery with a predetermined temperature; and continuing to charge, at the circuit module, the rechargeable battery if the detected temperature of the rechargeable battery is lower than the predetermined temperature, and cutting off a charging line to interrupt charging of the rechargeable battery if the temperature of the rechargeable battery is equal to or higher than the predetermined temperature.

19. The method of claim 18, further comprising:

detecting, at a temperature sensor module of the contact module, a temperature of the rechargeable battery through a first line that couples the temperature sensor module to a ground terminal of the contact terminals when the battery is being charged, the temperature sensor module being adjacent to contact terminals of the contact module.

20. The method of claim 18, wherein the temperature sensor module comprises a sensor comprising at least one of a thermistor, a platinum resistance temperature sensor, a thermocouple, a radiation thermometer, and an integrated circuit temperature sensor.

* * * * *